United States Patent [19]

Lewis

[11] 4,088,387
[45] May 9, 1978

[54] OPTICAL SWITCH

[75] Inventor: Adolph L. Lewis, La Mesa, Calif.

[73] Assignee: The United States of America as represented by the Secretary of the Navy, Washington, D.C.

[21] Appl. No.: 770,863

[22] Filed: Feb. 22, 1977

[51] Int. Cl.² ............................................. G02B 5/16
[52] U.S. Cl. ............................... 350/96.15; 250/227; 350/96.24
[58] Field of Search ................. 350/96 C, 96 B, 96 R; 250/227

[56] References Cited

U.S. PATENT DOCUMENTS

| 3,411,011 | 11/1968 | Genahr et al. | 350/96 B |
| 3,541,340 | 11/1970 | Binks | 350/96 B |
| 3,934,246 | 1/1976 | Mueller | 350/96 B |

OTHER PUBLICATIONS

IBM Tech. Disc. Bulletin, vol. 18, No. 2, Jul. 1975, by Burke et al., pp. 481–482.

*Primary Examiner*—John K. Corbin
*Assistant Examiner*—Stewart Levy
*Attorney, Agent, or Firm*—R. S. Sciascia; G. J. Rubens; J. W. McLaren

[57] ABSTRACT

An optical switch affords the selective coupling of any of a plurality of input light signals to any of a plurality of optical output paths. A first plurality of ports circumferentially disposed in a first common plane supports means for transmitting and/or receiving optical signals. A second plurality of ports similarly circumferentially disposed in a second common plane having the same central axis as the first common plane, supports means for transmitting and/or receiving optical signals. A rotatable assembly is mounted on a common support structure with the input and output ports and has first and second members which are independently movable about the central axis. A length of flexible fiber optic bundle has one end supported by a radial arm of the first rotatable member for alignment with a selected one of the first plurality of ports and the other end of the flexible fiber optic bundle is supported by a radial arm of the second rotatable member for alignment with any one of the second plurality of ports. The input and output ports are adapted to receive the terminal end of fiber optic cables, electro-optic transducers, or photo-responsive transducers as desired.

12 Claims, 1 Drawing Figure

U.S. Patent   May 9, 1978   4,088,387
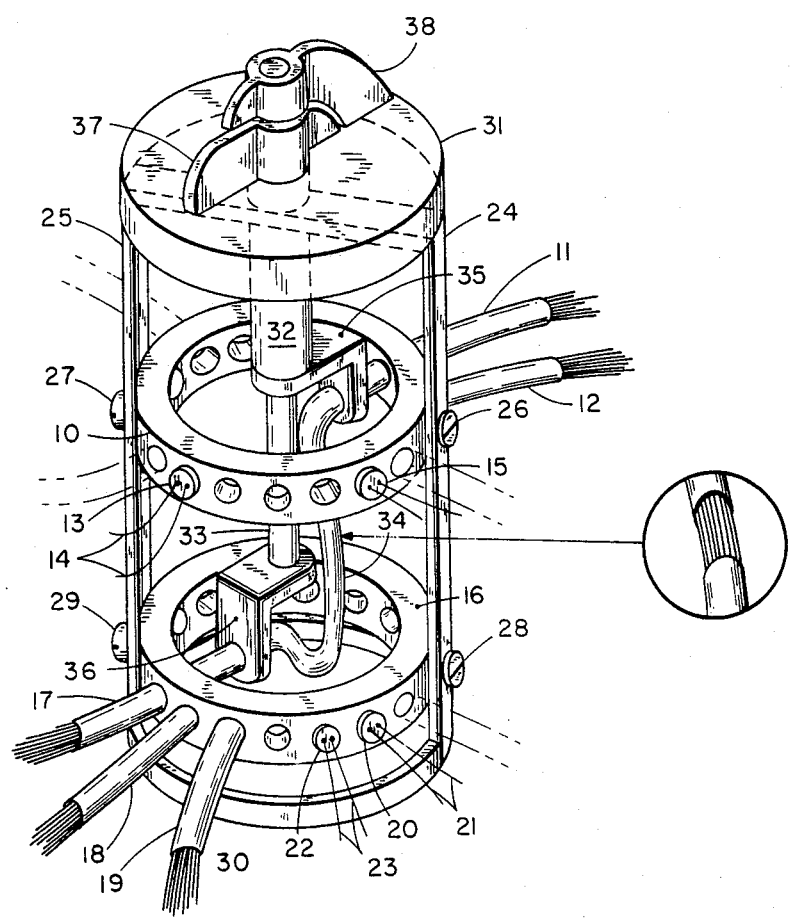

OPTICAL SWITCH

BACKGROUND OF THE INVENTION

Optical systems have found increasing favor for the transmission of signal information and data to the extent that such optical systems are in many cases replacing, at least in part, functionally analogous systems which previously had employed electrical and electronic signal transmission techniques. As in the case of electrical and electronic signal transmission systems, the functionally comparable optical signal information transmission systems must provide the capability of selectively switching optical signals from one transmission path to another.

The primary purpose of the present invention is to switch light energy, usually in the form of a modulated light beam, from one of a plurality of optical paths to a selected one of another plurality of optical paths. In prior art practices the switching of light energy from one path to another has been achieved in a number of different ways. Among prior art techniques, mechanical motion of a deflecting mirror positioned to intercept light energy signals has been employed to redirect the light energy of a beam to another optical light path. Unfortunately, however, many of such prior art systems, practices, and techiques inherently incurred disadvantages which could not be readily eliminated nor corrected.

For example, one of the disadvantages of the deflecting mirror technique is the fact that it is only capable of providing straight line transmission between two points which is an undesirable inherent limitation.

Additionally, many of the prior art techniques and practices require electrical and/or servomechanism actuation and are not readily adaptable to manual selection operation.

Furthermore, many prior art techniques are limited to switching light energy signals from one path to another of two paths; relatively few techniques have been evolved which satisfactorily provide for the transfer of light energy signals from any selected one of a first plurality of many optical paths to any selected one of a second plurality of many optical paths.

Accordingly, a need exists for an optical switch which may be manually operated to selectively switch optical signals by coupling any of a plurality of input optical signals to any of a plurality of optical output paths.

SUMMARY OF THE INVENTION

The present invention comprises an optical switch for selectively coupling any of a plurality of input optical signals to any selected one of a plurality of optical output paths. A first plurality of ports is radially disposed at the circumference of a first common plane such as may be achieved by a ring-like member having ports adapted to support means for either transmitting or receiving optical signals.

The means for transmitting and/or receiving optical signals, may be a source of optical input signals such as an electro-optic transducer in the form of a light emitting diode, for example, responsive to input electrical signals to develop commensurate light energy signals, or a light responsive device such as a PIN diode which is responsive to light energy signals to develop commensurate output electrical signals. Any of the aforementioned means for transmitting and/or receiving optical signals may be employed in the present invention in addition to any other means capable of transmitting input optical signals or responsive to either generate optical signals or transduce optical signals to another form of energy.

A second plurality of similar ports may be radially disposed at the circumference of a second common plane having the same central axis as the first common plane where it may take the form of a ring-like member with ports adapted to support a second plurality of means for transmitting and/or receiving optical signals.

A rotatable assembly is mounted on a common support structure with the input ports and output ports, the rotatable assembly having first and second members which are independently movable about the central axis. The first member of the rotatable assembly may desirably be hollow in a preferred embodiment of the present invention and the second member of the rotatable assembly may be dimensioned and configured to be supported within and extend through the hollow cylindrical portion of the first member of the rotatable assembly.

A length of flexible optic bundle has one of its ends supported by a radial arm of the first member for facilitating alignment with a selected one of the first plurality of ports; the other end of the length of flexible fiber optic bundle is supported by a radial arm of the second member of the rotatable assembly for alignment with a selected one of the second plurality of ports.

In a preferred embodiment of the present invention the first and second members of the rotatable assembly are connected to separate knobs which facilitate independent manual selection of alignment of one end of the flexible fiber optic bundle with any of the first plurality of ports and the other end of the fiber optic bundle for alignment with any of the second plurality of ports.

Additionally, in a preferred embodiment of the present invention the independently manually operative knobs controlling the disparate rotational disposition of the first and second members of the rotatable assembly are so configured as to limit the relative movement of the first member of the rotatable assembly to less than 180° relative to the second member of the rotatable assembly, thus obviating any undue stress and strain on the length of flexible fiber optic bundle which provides the flexible optical path between selected input and output ports.

Accordingly, it is a primary object of the present invention to provide an optical switch for selectively coupling any one of a plurality of independent input optical signals to any one of a plurality of optical output paths.

An equally important object of the present invention is to provide a flexible light path between first and second pluralities of optical paths for selectively connecting any of said first plurality of optical paths with any of the second plurality of optical paths.

A further object of the present invention is to provide such a selectively functional optical switch which affords manual operation.

Yet another object of the present invention is to provide such a manually operable optical switch which is adapted to provide for the selective switching of a relatively great number of input and output optical signals at a single switching junction.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWING

The drawing is an isometric view of a preferred embodiment of the present invention.

DESCRIPTION OF THE PREFERRED EMBODIMENT

In the drawing a first plurality of ports is radially disposed at the circumference of a first common plane in a ring-like structure 10. The ports are configured and adapted to support means for transmitting and/or receiving optical signals. The means for transmitting and/or receiving optical signals may, for example, comprise the terminal ends of fiber optic cables such as are illustrated at 11 and 12 or an electro-optic transducer 13 which may take the form of a light emitting diode responsive to electrical signals impressed upon input connection 14 which cause the light emitting diode 13 to develop commensurate electrical signals.

Conversely, any of the plurality of ports in the ring-like structure 10 is adapted to support a light responsive transducer such as PIN diode 15 which responds to received light energy signals to produce commensurate electrical signals at its output terminals.

A second plurality of ports is radially disposed at the circumference of a second common plane having the same central axis as the first common plane and as provided by the ring-like structure 16. The second plurality of ports similarly is adapted and dimensioned to receive and support means for transmitting and receiving optical signals. By way of example, such means may comprise the terminal ends of fiber optic cables 17, 18, and 19 which may take the form of either single filament fiber optic cable or multi filament fiber optic cable as desired. Each of the second plurality of ports is adapted also to receive and support alternative sources of light energy signals as may be provided by a light emitting diode 20, for example, which is responsive to electrical input signals impressed upon its input connections 21 to generate commensurate light energy signals.

The second plurality of ports is also configured and adapted to receive and support a photo responsive means such as a PIN diode 22 which is responsive to received light energy signals to produce commensurate electrical signals at its output connections 23.

The first ring structure and the second ring structure are attached to common supports 24 and 25 by suitable means such as the screws 26, 27, 28, and 29. The supports 24 and 25 are also connected to a base 30 and an upper plate member 31 which completes the support structure.

A rotatable assembly is mounted at the central axis of the common support structure through the upper plate 31. In a preferred embodiment of the present invention, the rotatable assembly has a first member 32 which may be hollow. A second member 33 of the rotatable assembly is rod-like in configuration and is supported by and extends through the hollow inner cylindrical portion of the first member 32 of the rotatable assembly.

A length of flexible fiber optic bundle 34 provides a flexible optical path for connecting any selected one of the first plurality of ports with any selected one of the second plurality of ports. The flexible fiber optic bundle is shown in an enlarged insert to the right of the drawing with its cladding removed to illustrate the multiple flexible fiber optic filaments which it includes. The fiber optic bundle is selected for the purpose of providing the flexible optical path in the present invention because of its relative durability and reliability when repeatedly flexed into different positions.

The length of flexible fiber optic bundle 34 as illustrated in the drawing has one end supported by a radial arm 35 of the first member 32 of the rotatable assembly for alignment with a selected one of the first plurality of ports. The other end of flexible fiber optic bundle 34 is supported by a radial arm 36 of the second member 33 of the rotatable assembly for alignment with a selected one of the second plurality of ports.

The first and second members 32 and 33 of the rotatable assembly are connected to separate knobs 37 and 38, respectively, so that the first and second members may be rotated as desired to any selected position independently of each other.

In the preferred embodiment of the present invention as illustrated in the drawing, it will be noted that though the separate knobs 37 and 38 are coaxially mounted in a tandem fashion on the same central axis, knob 37 has a radial extension rotatable in an arcuate plane which is orthogonal to the central axis and lies immediately above the upper plate member 31. The other knob 38, which is attached to the second member of 33 of the rotatable assembly, also has a radial extension which is configured at its outer radial extension to intersect the same arcuate plane, thus operating to confine the relative rotation of the two knobs 37 and 38 to less than 180° and obviate any undue stress or strain on the flexible optical path in the form of the flexible fiber optic bundle 34.

It is readily apparent from the illustration of the preferred embodiment shown in the drawing that the configuration of knobs 37 and 38 is such that knob 37 may be rotated somewhat less than 180° in either direction before its outer radial extremity will strike a portion of the knob 38. Similarly, the outer radial portion of knob 38 is so configured that it will strike knob 37 upon being rotated slightly less than 180° in either direction.

It should be appreciated, however, that the configuration of the rotatable assembly, particularly as illustrated in the preferred form of the actuating knobs 37 and 38 which connect with the first and second members 32 and 33, respectively, is such as to permit the selective alignment of the flexible fiber optic bundle 34 with any one of the first plurality of ports and similarly the other end of the flexible fiber optic bundle may be selectively aligned with any one of the second plurality of ports. Thus, the optical switch of the present invention permits the selective connection of any one of a first plurality of many transmitting and/or receiving means with any one of a second plurality of many transmitting and/or receiving means.

Moreover, those skilled and knowledgeable in the pertinent arts will readily appreciate that the present invention is readily adaptable to employ terminal ends of fiber optic cables as the transmitting and/or receiving means for optical signal information. but may also be advantageously used with any other source of optical signals or means for transmitting optical signal information.

Obviously many modifications and variations of the present invention are possible in the light of the above teachings. It is therefore to be understood that within the scope of the appended claims the invention may be practiced otherwise than as specifically described.

What is claimed is:

1. An optical switch for selectively coupling any of a plurality of input optical signals to any of a plurality of optical output paths comprising:
   a first plurality of ports radially disposed at the circumference of a first common plane, and adapted to support means for transmitting and receiving optical signals;
   a second plurality of ports radially disposed at the circumference of a second common plane have the same central axis as said first common plane, and adapted to support means for transmitting and receiving optical signals;
   a rotatable assembly mounted on a common support structure with said input ports and said output ports,
   said rotatable assembly having first and second members independently movable about said central axis; and
   a length of flexible fiber optic bundle having one end supported by a radial arm of said first member for alignment with a selected one of said first plurality of ports, and its other end supported by a radial arm of said second member for alignment with a selected one of said second plurality of ports.

2. An optical switch as claimed in claim 1 wherein said means for transmitting and receiving optical signals includes light generating transducers and photo-responsive elements.

3. An optical switch for selectively coupling any of a plurality of input optical signals to any of a plurality of optical output paths comprising:
   a plurality of input ports radially disposed at the circumference of a first common plane, each of said input ports being dimensioned to receive and support means for transmitting optical signals;
   a plurality of output ports radially disposed at the circumference of a second common plane having the same central axis as said first common plane, each of said output ports being dimensioned to receive and support means for receiving optical signals;
   a rotatable assembly mounted on a common support structure with said input ports and said output ports,
   said rotatable assembly having first and second members independently movable about said central axis; and
   a length of flexible fiber optic bundle having one end supported by a radial arm of said first member for alignment with any selected input ports, and its other end supported by a radial arm of said second member for alignment with any selected output port.

4. An optical switch as claimed in claim 3 wherein said means for transmitting optical signals includes light generating transducers.

5. An optical switch as claimed in claim 4 wherein said light generating transducers comprise light emitting diodes.

6. An optical switch as claimed in claim 3 wherein said means for receiving optical signals includes light responsive elements.

7. An optical switch as claimed in claim 6 wherein said light responsive elements comprise PIN diodes.

8. A fiber optic switch for selectively coupling any of a plurality of input optical signals to any of a plurality of optical output paths comprising:
   a plurality of input ports radially disposed at the circumference of a first common plane,
   each of said input ports being dimensioned to receive and support the terminal of a fiber optic cable adapted to transmit input optical signals;
   a plurality of output ports radially disposed at the circumference of a second common plane having the same central axis as said first common plane,
   each of said output parts being dimensioned to receive the end of a fiber optic cable adapted to receive and transmit optical signals;
   a rotatable assembly mounted on a common support structure with said input ports and said output ports,
   said rotatable assembly having first and second members independently movable about said central axis; and
   a length of flexible fiber optic bundle having one end supported by a radial arm of said first member for alignment with any selected input port, and its other end supported by a radial arm of said second member for alignment with any selected output port.

9. A fiber optic switch as claimed in claim 8 wherein said first member of said rotatable assembly includes a hollow cylindrical portion and said second member of said rotatable assembly is supported within and extends through said hollow cylindrical portion.

10. A fiber optic switch as claimed in claim 8 wherein said first and second member of said rotatable assembly are connected with separate knobs for independent manual selection of alignment with any of said input ports and any of said output ports, respectively.

11. A fiber optic switch as claimed in claim 10 wherein said separate knobs are so configured as to permit no more than 180° rotation of one knob relative to the other.

12. A fiber optic switch as claimed in claim 10 wherein said separate knobs are coaxially mounted in tandem on said central axis with one of said knobs having a radial extension rotatable in an arcuate plane orthogonal to said central axis and the other of said knobs having a radial extension configured to intersect said arcuate plane for confining the relative rotation of said knobs to less than 180°.

* * * * *